United States Patent
Du

(10) Patent No.: US 11,888,970 B2
(45) Date of Patent: Jan. 30, 2024

(54) METHOD AND SYSTEM FOR DERIVING KEY FROM BASEKEY BUILT-IN CHIP

(71) Applicant: MONTAGE ELECTRONICS (SHANGHAI) CO., LTD., China (Shanghai) Pilot Free Trade Zone (CN)

(72) Inventor: Zhaohui Du, Shanghai (CN)

(73) Assignee: MONTAGE ELECTRONICS (SHANGHAI) CO., LTD., Shanghai (CN)

( * ) Notice: Subject to any disclaimer, the term of this patent is extended or adjusted under 35 U.S.C. 154(b) by 333 days.

(21) Appl. No.: 17/505,023

(22) Filed: Oct. 19, 2021

(65) Prior Publication Data

US 2022/0158828 A1 May 19, 2022

(30) Foreign Application Priority Data

Nov. 18, 2020 (CN) .......................... 202011295488.7

(51) Int. Cl.
| | |
|---|---|
| *H04L 9/08* | (2006.01) |
| *G06F 17/16* | (2006.01) |
| *H04L 9/32* | (2006.01) |
| *G06F 8/71* | (2018.01) |

(52) U.S. Cl.
CPC ............ *H04L 9/0825* (2013.01); *G06F 17/16* (2013.01); *H04L 9/0866* (2013.01); *H04L 9/3239* (2013.01)

(58) Field of Classification Search
CPC ... H04L 9/0825; H04L 9/0866; H04L 9/3239; H04L 9/0891; G06F 17/16; G06F 8/71
See application file for complete search history.

(56) References Cited

U.S. PATENT DOCUMENTS

| | | | |
|---|---|---|---|
| 8,849,825 B1* | 9/2014 | McHugh | G06F 16/1873 707/737 |
| 9,813,392 B2 | 11/2017 | Lorenz et al. | |
| 2005/0010767 A1* | 1/2005 | Craft | G06F 21/123 713/168 |
| 2007/0140481 A1* | 6/2007 | Parameswaran Rajamma | H04L 9/0891 380/37 |
| 2008/0133929 A1* | 6/2008 | Gehrmann | G06F 21/51 713/179 |
| 2009/0187766 A1* | 7/2009 | Vuillaume | H04L 63/0853 713/176 |
| 2015/0379270 A1* | 12/2015 | Chen | H04L 9/0894 713/2 |
| 2017/0031028 A1* | 2/2017 | Fernandez Hernandez | G01S 19/02 |
| 2017/0187526 A1* | 6/2017 | Ferguson | G06F 21/57 |

(Continued)

FOREIGN PATENT DOCUMENTS

| | | | |
|---|---|---|---|
| CN | 105337725 A | | 2/2016 |
| WO | WO-2021084220 A1 * | 5/2021 | ........... G06F 21/575 |

*Primary Examiner* — Darren B Schwartz
(74) *Attorney, Agent, or Firm* — Oliff PLC

(57) ABSTRACT

The present disclosure provides systems and methods for deriving a key from a basekey built-in a chip is provided. In an exemplary embodiment, there is provided a method for deriving a key from basekey built-in a chip that may comprise obtaining a basekey built-in the chip and a current version number when the chip starts up and runs read-only boot code, and performing iterations on the basekey via a one-way function to obtain a derived key of the current version. The number of times of the iterations is equal to the difference between a maximum version number and the current version number.

16 Claims, 4 Drawing Sheets

(56) References Cited

U.S. PATENT DOCUMENTS

| | | | | |
|---|---|---|---|---|
| 2018/0157840 A1* | 6/2018 | Crowley | ............... | H04L 9/0861 |
| 2019/0319798 A1* | 10/2019 | Chalkias | ............... | H04L 9/3236 |
| 2019/0384593 A1* | 12/2019 | Michiyama | ............. | G06F 21/64 |
| 2020/0059780 A1 | 2/2020 | Hess et al. | | |
| 2020/0082088 A1* | 3/2020 | Muthukumaran | ...... | G06F 21/64 |

* cited by examiner

METHOD AND SYSTEM FOR DERIVING KEY FROM BASEKEY BUILT-IN CHIP

REFERENCE TO RELATED APPLICATION

This application claims priority to Chinese Application number CN2020112954887, filed on Nov. 18, 2019, the contents of which are incorporated herein by reference.

TECHNICAL FIELD

The application relates to the field of information security, in particular to a method and a system for deriving a key from a basekey built-in a chip.

BACKGROUND

For many chips with security function, it is necessary to provide basekeys built-in the chips. For example, one or more basekeys are written in an OTP (One Time Programmable) storage space of a chip which could be read by firmware codes of the chip and deriving more keys. In view of security issues (for example, the firmware codes are found to have security vulnerabilities or out of service cycles, etc.), the basekeys built-in the chip will be considered as no longer safe after being used for a period of time and need to be updated. There are two conventional methods for updating the basekeys built-in a chip.

One method is to provide multiple sets of the OTP basekeys in advance. When the basekeys needs to be updated, the firmware switches from one set of the OTP basekeys to another. The disadvantage of this method is that usually only limited sets of the OTP basekeys can be provided in advance, and it cannot support too many basekeys update services.

Another method is to use a standard key derivation algorithm (for example, NIST-800-108) to derive keys from an OTP basekey. This method implements the key derivation function (KDF) by running a read-only boot code in a BOOT-ROM, then reads the OTP basekey in the boot code, and then prohibits subsequent codes (including the boot code itself) from accessing the OTP basekey until the system is restarted. Thereafter, the boot code reads a security version number of current firmware code, and generates a derived key derived_base_key=KDF (otp_base_key, security_version) associated to an OTP basekey and the security_version number by calling the key derivation function, wherein the otp_base_key refers to the OTP basekey, the security_version refers to the security version number, the derived_base_key refers to the derived key, and the KDF refers to the key derivation function. And at the same time, the OTP basekey otp_base_key is completely deleted from the memory. The firmware code will then use the derived_base_key as a new version of the basekey instead of directly using the otp_base_key. In this method, the otp_base_key can only be accessed by a small piece of the read-only boot code, and will only be used in the boot process, so the basekeys are not easy to leak and the security can be easily guaranteed. When a certain version of the basekey derived_base_key is no longer safe, as long as a new firmware code is republished and updated to a higher version, it can automatically switch to a basekey derived_base_key of a higher version.

However, in some scenarios, the user needs the firmware to use a basekey derived_base_key to derive a data encryption key to encrypt and protect the user's confidential data. Then, after the system restarts, the user needs the firmware to rederive the same key to decrypt the data. In the above software key derivation algorithm, since the firmware always generates only a basekey corresponding to current security version number, after the basekey is updated, the data encrypted with the key derived from the old version of the basekey cannot be decrypted. In order to solve this problem, the firmware needs to calculate and generate the basekeys of all historical versions at the same time and there may be many historical versions of the basekeys, which wastes firmware storage space and is relatively inefficient.

Therefore, it is necessary to provide a method for deriving a key from a basekey built-in a chip with forward compatibility.

SUMMARY OF THE INVENTION

The present disclosure provides systems and methods for deriving key from a basekey built-in a chip is provided. In an exemplary embodiment, there is provided a method for deriving key from a basekey built-in a chip that may comprise obtaining a basekey built-in the chip and a current version number when the chip starts up and runs a read-only boot code, and performing iterations on the basekey via a one-way function to obtain a derived key of a current version, and a number of times of the iterations is equal to a difference between a maximum version number and the current version number.

According to one embodiment, performing iterations on the derived key of the current version to generate a historical derived key when the historical derived key of a previous version prior to the current version number is required to be used, a number of times of the iterations is equal to a difference between the current version number and the previous version number.

According to one embodiment, after obtaining the basekey built-in the chip, the method further comprises: disabling any code from accessing the basekey.

According to one embodiment, the one-way function is a secure hash function or a symmetric encryption function.

According to one embodiment, the maximum version number is 255.

In another exemplary embodiment, there is provided a system for deriving a key from a basekey built-in a chip that may comprise an acquisition module configured to obtain a basekey built-in a chip and a current version number when the chip starts up and runs a read-only boot code, and a calculation module configured to perform iterations on the basekey via a one-way function to obtain a derived key of a current version, and a number of times of the iterations is equal to a difference between a maximum version number and the current version number.

In yet another exemplary embodiment, there is provided a method for deriving a key from a basekey built-in a chip that may comprise obtaining a basekey built-in the chip and a current version number when the chip starts up and runs a read-only boot code, constructing a tree, and performing iterations on the basekey by visiting nodes of the oriented tree in a topological order to obtain the derived key of a current version. Each node in the oriented tree corresponds to a version, a topological order number of each node indicates a version number corresponding to the node, the basekey is located at a root node of the oriented tree, and a version number of any node is smaller than a version number of its parent node. The oriented tree must provide at least two different one-way functions.

According to one embodiment, the one-way function is a secure hash function, and at least two different one-way functions are derived by adding auxiliary parameters to the secure hash function.

According to one embodiment, the step of performing iterations on the basekey by visiting the tree in the topological order to obtain the derived key of the current version further comprises: hiding nodes with version numbers larger than the current version number in the oriented tree; and performing iterations on the basekey to generate derived keys of version numbers corresponding to all nodes whose parent nodes are hidden.

According to one embodiment, the method may further comprise:

Performing iterations on the derived key of the current version according to the topological order of the oriented tree to generate a historical derived key when the historical derived key of a previous version prior to the current version number which has not been iteratively generated is required to be used.

According to one embodiment, the oriented tree is a two-dimensional matrix graph, wherein a first node in each row in the two-dimensional matrix graph comprises a longitudinal sub-node and a transverse sub-node, a last node in each row does not comprise any sub-node, and remaining nodes of the oriented tree each only comprises a transverse sub-node; wherein, nodes in a first column in the two-dimensional matrix graph perform iterations via a first one-way function, and nodes in each row in the two-dimensional matrix graph perform iterations via a second one-way function; and the topological order numbers of the nodes in each row decreases one by one, and the topological order number of the last node in each row is greater than that of all nodes on its next row.

According to one embodiment, the step of performing iterations on the basekey according to the oriented tree and the topological order to obtain the derived key of the current version further comprises: performing iterations on the basekey to generate the derived key of the current version and the derived key of a version corresponding to the first node in a row next to a row in which a node with the current version is located.

According to one embodiment, the method may further comprise:

Performing iterations on the derived key of the current version or the derived key of the version corresponding to the first node in the row next to the row in which the node with the current version is located according to the topological order numbers of the oriented tree to generate a history derived key when the historical derived key of a previous version prior to the current version number is required to be used.

In yet another exemplary embodiment, there is provided a system for deriving a key from a basekey built-in a chip that may comprise an acquisition module configured to obtain a basekey built-in a chip and a current version number when the chip starts up and runs a read-only boot code, a construction module configured to construct an oriented-tree and a calculation module configured to perform iterations on the basekey by visiting the oriented tree in a topological order to obtain the derived key of the current version. Each node in the oriented tree corresponds to a version, a topological order number of each node indicates a version number corresponding to the node, the basekey is located at a root node of the oriented tree, and a version number of any node is smaller than a version number of its parent node. The oriented tree adopts at least two different one-way functions.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

In the following description, numerous technical details are set forth in order to provide the reader with a better understanding of the present application. However, those skilled in the art can understand that the technical solutions claimed in the present application can be implemented without these technical details and various changes and modifications based on the following embodiments.

Explanation of some concepts:

BOOT-ROM: a small block of mask ROM or write-protected flash memory embedded in a processor chip that contains code (or refers as read-only boot code) that the processor firstly executes on power-up or reset. Depending on the configuration of some pins or internal fuses, it can decide where to load the next part of the code to be executed and whether or how to verify its correctness or validity. Sometimes it may contain other functions, which may be used by user code during or after boot.

Basekey (or also refer as Root key): one or more keys written at one time into the OTP storage space of a chip, which are used by firmware code of the chip to read and derive more keys.

Firmware: a program written into an erasable programmable read-only memory (EPROM) or an electrically erasable programmable read-only memory (EEPROM), which refers to a "device drive program" stored inside the device. Through the firmware, an operating system can realize running operation of a specific machine according to the standard device drive. The BOOT-ROM is a very special part of the firmware, other firmware are not stored in the ROM. In the process of chip boot, the BOOT-ROM is run first, and the BOOT-ROM code loads remaining firmware code and then jumps to execute the loaded firmware code.

In order to make the objects, technical solutions and advantages of the present application more clear, embodiments of the present application will be further described in detail below with reference to the accompanying drawings.

Embodiment I

Figure 1:
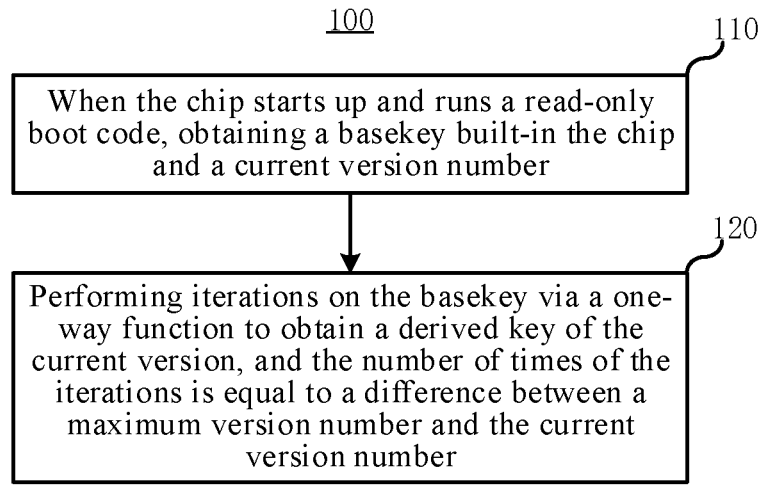
FIG. 1 is a flowchart of a method for deriving a key from a basekey built-in a chip according to an embodiment of the present application.

The first embodiment of the present application discloses a method for deriving a key from a basekey built-in a chip. FIG. 1 is a flowchart of a method 100 for deriving a key from a basekey built-in a chip according to an embodiment. The method comprises the following steps.

Step 110, obtaining a basekey built-in the chip and a current version number (also referred as a current security version number) when the chip starts up and runs read-only boot code. It should be noted that the version number (also referred as security version number) of a firmware in the chip is usually used as the current version number.

Step 120, performing iterations on the basekey via a one-way function to generate a derived key of a current version, and the number of times of the iterations is equal to the difference between a maximum version number (also referred as a maximum security version number) and the current version number.

In an embodiment, after obtaining the basekey built-in the chip, the method further comprises: prohibiting any code from accessing the basekey. It should be understood that after the derived key is iteratively generated, any code is prohibited from accessing the basekey and the derived key is used as the basekey of the system.

In an embodiment, the one-way function is a secure Hash function or a symmetric encryption function.

In an embodiment, the maximum version number is 255.

In an embodiment, the method may further comprise: performing iterations of the derived key of the current version to generate a historical derived key when the historical derived key of a previous version prior to the current version number is required to be used, the number of times of the iterations is equal to the difference between the current version number and the previous version number. In this embodiment, instead of the traditional KDF, a one-way function is used to perform iterations to generate a derived key, so that the basekey of a new version can be used to derive the key of an old version in one direction, but the key of an old version cannot be used to derive the key of an new now, and it solves the problem of decryption of historical data after the key has been updated.

In order to better understand the technical solutions of this specification, the following description will be given with a specific embodiment. The details listed in this embodiment are mainly for ease of understanding and are not intended to limit the scope of protection of this application.

Assuming that the maximum security version number that a certain chip expects to be supported refers as MAXVERSION (MAXVERSION is an integer greater than or equal to zero, for example, MAXVERSION=255), a basekey otp_base_key in the OTP is read by the boot code in the BOOT-ROM, and any subsequent code is prohibited from accessing the basekey otp_base_key. The boot code continues to read the security version number security_version of current firmware code, wherein 0<=security_version <=MAXVERSION, and then uses the one-way function H to perform iterations on the basekey otp_base_key to generate the derived key derived_base_key, wherein the number of times of iterations is equal to MAXVERSION-security_version, that is, executes the following procedure:

```
Derived_base_key = opt_base_key;
For (i=security_version; i < MAXVERSION; i + +) {
    Derived_base_key = H (derived_base_key);
}
Return derived_base_key;
```

Figure 2:
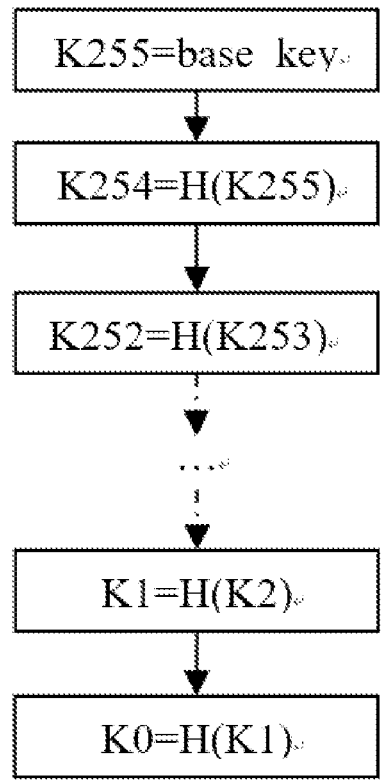
FIG. 2 is a schematic diagram of a linear derivation method according to an embodiment of the present application.

Then the firmware code only needs to save the derived key derived_base_key corresponding to the current security version number security_version, and uses the derived key derived_base_key as the basekey of the system. FIG. 2 shows a process of deriving the key of each version in the present embodiment, wherein K255 represents a derived key of the version number 255, K254=H(K255) represents a derived key of the version number 254, which is generated by performing iterations on the K255 via the one-way function H, K253=H(K254) represents a derived key of the version number 253, which is generated by performing iterations on the K254 via the one-way function H, and so on. Usually, the system is gradually updated from version number 0 to a higher version. K0 is generated by performing 255 times of iterations on the K255 at first, K1 is generated by performing 254 times of iterations on the K254 if an update of the security version number is needed, and so on, and the corresponding key is adopted as the version number is updated.

For example, if the current security version number security_version is updated to 10, there are 10 derived keys K0, K1, . . . , K9 corresponding to security version numbers 0, 1, . . . , 9 generated and used by the boot code in the BOOT-ROM, the versions of derived keys K0, K1, . . . , K9 are 0, 1, . . . , 9, respectively and the derived keys K0, K1, . . . , K9 are generated by performing 255, 254, . . . , 246 times of iterations on the basekey otp_base_key via the one-way function H, respectively. The security version number 10 generates a derived key K10 by performing 245 times of iterations on the basekey otp_base_key via the one-way function H and stores K10 in a firmware-specific memory (e.g., SRAM). If the user needs to request decryption of the user data encrypted by the derived key K8 corresponding to the historical security version number 8, the firmware code only needs to call the H function to perform twice of iterations on the K10 to generate the derived key K8 corresponding to the historical security version number 8, that is, calculates K8=H(H(K10)), and then uses the derived key K8 for the user to derive the corresponding key that is used to encrypt the historical data to decrypt the encrypted historical data.

The one-way function H may be a secure hash function (e.g., SM3, SHA256). It should be understood that for a given input x, there is a very fast and efficient algorithm, for example, the one-way function H, to calculate H(x). But for a given H(x), there is no effective algorithm to obtain the corresponding x, which is almost impossible to achieve under current computing condition. In the present disclosure, the one-way function may also be a symmetric encryption algorithm (e.g., AES, SM4, etc.) that uses x as a key to encrypt data.

In the present embodiment, this kind of derivation method in which keys of the various versions are generated through successive iterations can be called as a linear derivation method.

Embodiment II

Figure 3:
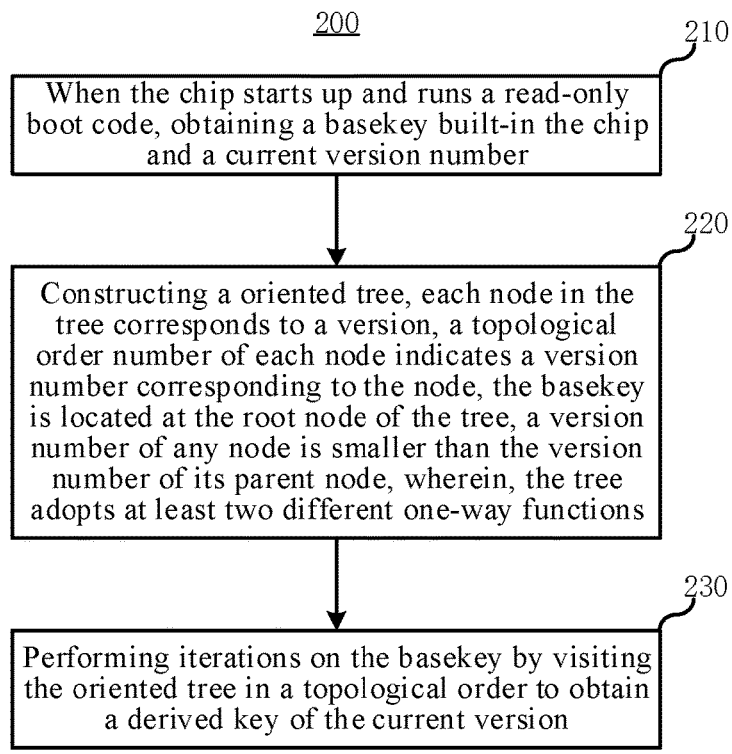
FIG. 3 is a flowchart of a method for deriving a key from a basekey built-in a chip according to another embodiment of the present application.

The Embodiment II of the present application discloses a method for deriving a key from a basekey built-in a chip. When the maximum security version number that the keys needs to support is large, whether it is to generate the derived key of the current security version or to generate the historical derived keys from the derived key of the current security version, it may be necessary to perform iterations via the one-way function many times, which causes a problem in the efficiency of generating the derived key. For example, to support the maximum security version number of 16 bits requires a maximum 64K times of iterations. To this end, the embodiment II of the present disclosure provides an improved method. FIG. 3 is a flowchart of the method 200 for deriving a key from a basekey built-in a chip. The method 200 comprises the following steps.

Step 210, obtaining a basekey built-in the chip and a current version number when the chip starts up and runs read-only boot code.

Step 220, constructing a oriented tree, each node in the oriented tree corresponds to a version, a topological order number of each node indicates a version number corresponding to the node, the basekey is located at a root node of the oriented tree, a version number corresponding to a child node of each node is smaller than a version number of its parent node. Wherein, the tree oriented adopts at least two different one-way functions.

In an embodiment, the one-way function is a secure hash function, and the at least two different one-way functions are derived by adding auxiliary parameters to the secure hash function.

Step 230, performing iterations on the basekey by visiting the oriented tree in a topological order to obtain a derived key of a current version.

In an embodiment, the step of performing iterations on the basekey by visiting the oriented tree in the topological order to obtain a derived key of the current version further comprises: hiding nodes with version numbers larger than the current version number in the oriented tree, and performing iterations on the basekey to generate derived keys of the version numbers corresponding to all nodes whose parent nodes are hidden.

In an embodiment, the method may further comprises: when a historical derived key of a previous version prior to the current version number which has not been iteratively generated is required to be used, performing iterations on the derived key according to the topological order of the oriented tree to generate the historical derived key.

In this embodiment, a plurality of different one-way functions may be derived by adding auxiliary parameters to a one-way function, for example, H1 (x)=H (x||"fun1"), H2 (x)=H (x||"fun2"), . . . , wherein the H1 and H2 represent two different one-way functions respectively, and the "fun1" and "fun2" represent two arbitrary strings respectively, the "||" represents concatenating two strings into one string. Therefore, in this embodiment, the linear derivation method in FIG. 2 can be improved to the tree derivation method.

Figure 4:
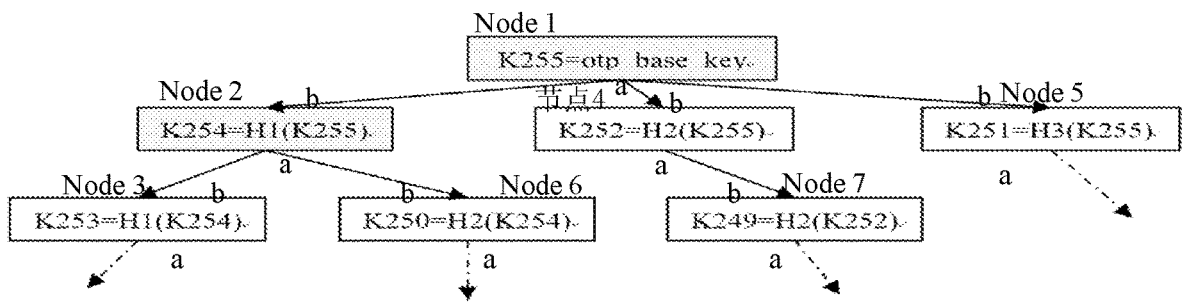
FIG. 4 is a schematic diagram of a tree derivation method according to an embodiment of the present application.

In one embodiment, the tree derivation method may adopt the oriented tree shown in FIG. 4. Firstly, given any oriented tree and its corresponding topological order (the root node of the oriented tree is ranked at the top, and for any oriented edge a→b represented by an arrow in the oriented tree, the parent node a must be ranked above the child node b in the topological order), the number of the nodes (represented by the boxes in FIG. 4) in the oriented tree needs to be exactly equal to the maximum security version number that can be supported. For example, the maximum security version number equals to 255, and the number of the nodes in the oriented tree equals to 256. Then, similar to the previous method, the security version number corresponding to the first node in the topological order is the basekey K255=otp_base_key corresponding to the maximum security version number MAXVERSION, the k-th node in the topological order corresponds to a derived key with a security version number of MAXVERSION-k+1. For example, the sixth node in FIG. 4 corresponds to the derived key K250=H2(K254) with a security version number 250. FIG. 4 only shows an example of an order of the nodes, in other embodiments, the nodes can be ordered in other different order. Wherein, the basekey corresponding to MAXVERSION (i.e., K255) will directly uses otp_base_key stored in the OTP, and for any other non-root nodes, if an arbitrary non-root node is the u-th child node of its parent node, its corresponding derived key is the result of the function Hu (.) acting on the derived key corresponding to the parent node. Specifically, K255 represents a key with security version number 255, K254=H1(K255) represents a key with security version number 254, which is generated by performing an iteration on the K255 via the one-way function H1, K253=H1(K254) represents a key with security version number 253, which is generated by performing an iteration on the K254 via the one-way function H1, K252=H2(K255) represents a key with security version number 252, which is generated by performing iterations on the K255 via the one-way function H2, and so on.

When the current security version number evolves to a version V, the boot code in the BOOT-ROM needs to hide nodes whose version number is greater than V in the oriented tree and then calculates derived keys corresponding to all remaining root nodes (i.e., nodes without parent nodes) in the left oriented graph and saves them to a firmware special memory, which can be used to calculate all historical derived keys.

For example, in FIG. 4, if the current security version number evolves to 253, that is, to the node corresponding to K253 in the oriented tree, then only the nodes corresponding to K254 and K255 in FIG. 4 need to be hidden, so there are four root nodes K253, K252, K251 and K250 remaining in the left oriented graph. It is required to calculate K255=otp_base_key, K254=H1(K255), K253=H1(K254), K252=H2(K255), K251=H3(K255), K250=H2(K254) and save the four derived keys K253, K252, K251 and K250 into a special SRAM. After that, these four derived keys can be used to derive all historical derived keys.

From the above, it can be seen that the tree derivation method in FIG. 4 reduces the number of times of iterations and improves computational efficiency. In order to further improve the calculation efficiency, some oriented tree with special shapes can also be used in this embodiment, so that the firmware code can easily analyze numbers of the derived keys that need to be saved according to the security current version and carry out key derivation.

In an embodiment, the oriented tree may be a two-dimensional matrix graph, a first node in each row in the two-dimensional matrix graph comprises a longitudinal sub-node and a transverse sub-node, a last node in each row does not comprise any sub-node, and the remaining nodes only each comprises a transverse sub-node. Nodes in the first column in the two-dimensional matrix graph perform iterations via a first one-way function, and nodes in each row in the two-dimensional matrix graph perform iterations via a second one-way function. The topological order number of the nodes in each row decreases one by one, and the topological order number of the last node in each row is greater than that of all nodes in its next row. In this embodiment, the tree derivation method can be improved into a matrix derivation method.

In this embodiment, the step of performing iterations on the basekey by visiting the oriented tree in topological order to obtain a derived key of the current version further comprises: performing iterations on the basekey to generate the derived key of the current version and the derived key of a version corresponding to a first node in a row next to a row in which the node with the current version is located.

In an embodiment, the method may further comprise: when a historical derived key of a previous version prior to the current version number is required to be used, performing iterations on the derived key of the current version or the derived key of the version corresponding to the first node in the row next to the row in which the node with the current version is located according to the topological order number of the tree to generate the history derived key.

Figure 5:
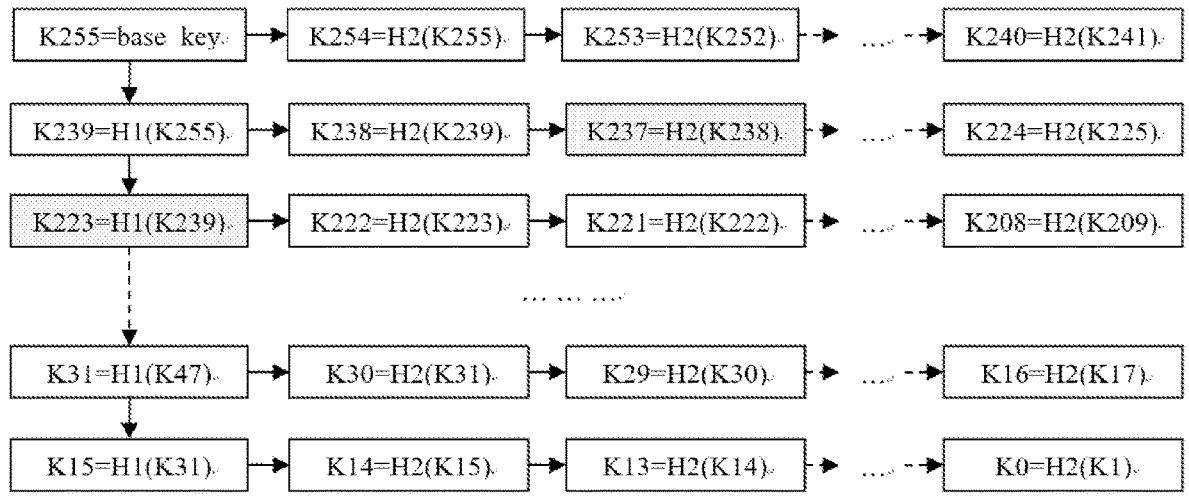
FIG. 5 is a schematic diagram of a matrix derivation method according to an embodiment of the present application.

For example, in one embodiment, the matrix derivation method can adopt the matrix graph shown in FIG. 5. A tree graph arranged in a two-dimensional 16×16 matrix can support a total of 256 security version number. Each node has at most two child nodes, with the first child node under it and the second child node on the right of it. It should be noted that some nodes only have a second child node without a first child node, and some nodes have no child nodes. The first child node adopts one-way function H1 and the second child node adopts one-way function H2. Specifically, K255 represents a key with security version number 255, K254=H2(K255) represents a key with security version number 254, which is generated by performing iteration on the K255 via the one-way function H2, K239=H1(K255) represents a key with security version number 239, which is generated by performing iterations on the K255 via the one-way function H1, and then K238=H2(K239) can be generated by performing an iteration on the K239 via the one-way function H2, and so on, K237, . . . , K224 can be obtained.

For example, when the current security version is 237, the boot code in the BOOT-ROM only needs to generate and save K237 and K223 (that is, save a derived key of the current security version and a derived key of the first node in the next row). K237 can be used to derive the history keys of security versions 224 to 236, and K223 can be used to derive the history derived keys below version 222, i.e., K0, . . . , K222. It is easy to see that in order to support 256 keys, this method only needs to generate and save two derived keys in advance, so that it can support all the derived keys of historical versions. In addition, H1 or H2 function only need to be executed 16 times at most during the operation. Similarly, deriving any historical keys from the saved basekey only needs to execute the H1 or H2 function a total of 31 times at most. For example, if a historical derived key K224 is needed, one-way function H2 can be used to perform iterations on K237 for 13 times. For another example, if a historical derived key K29 is needed, one-way function H1 can be used to perform iterations on K223 for 11 times to generate K31, and then one-way function H2 can perform iterations on K31 for twice to generate K29, which requires a total of 13 times of iterations.

It should be understood that we can also extend the above two-dimensional matrix structure to three-dimensional or four-dimensional, etc., so as to achieve a good balance between the number of derived keys that need to be saved in advance and the maximum times of iterations to derive a historical basekey.

Embodiment III

Figure 6:
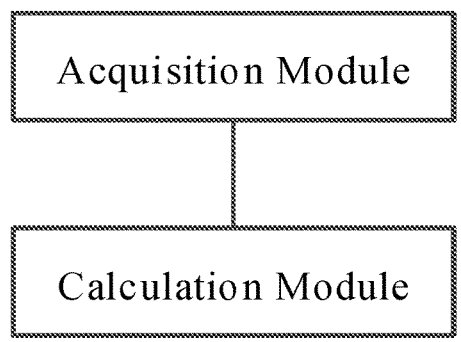
FIG. 6 is a schematic diagram of a system for deriving a key from a basekey built-in a chip according to an embodiment of the present application.

A third embodiment of the present application discloses a system for deriving a key from a basekey built-in a chip. FIG. 6 is a block diagram of the system for deriving a key from basekey a built-in a chip. The system comprises an acquisition module and a calculation module.

The acquisition module is configured to obtain a basekey built-in a chip and a current version number when the chip starts up and runs read-only boot code.

The calculation module is configured to perform iterations on the basekey via a one-way function to obtain a derived key of a current version, and the number of times of the iterations is equal to the difference between a maximum version number and the current version number.

The embodiment I is a method embodiment corresponding to the present embodiment, and the technical details in the embodiment I can be applied to the present embodiment, and the technical details in the present embodiment can also be applied to the embodiment I.

Embodiment VI

Figure 7:
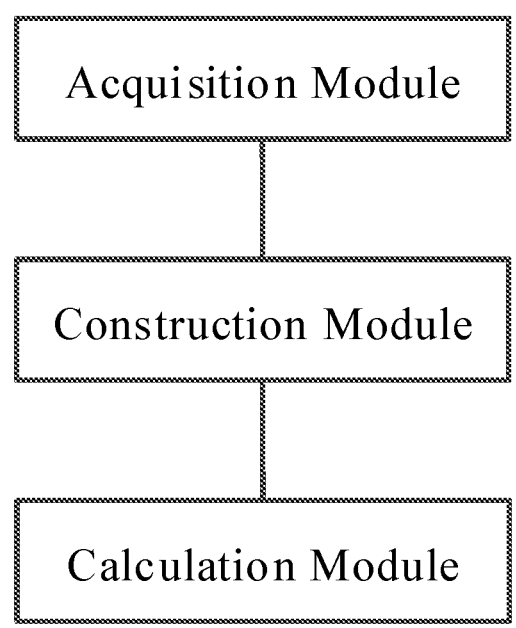
FIG. 7 is a schematic diagram of a system for deriving a key from a basekey built-in a chip according to another embodiment of the present application.

A fourth embodiment of the present application discloses a system for deriving a key from a basekey built-in a chip. FIG. 7 is a block diagram of the system for deriving a key from a basekey built-in a chip. The system comprises an acquisition module, a construction module and a calculation module.

The acquisition module is configured to obtain a basekey built-in a chip and a current version number when the chip starts up and runs read-only boot code.

The construction module is configured to construct an oriented tree, each node in the oriented tree corresponds to a version, a topological order number of each node indicates a version number corresponding to the node, the basekey is located at a root node of the oriented tree, a version number of any node is smaller than a version number of its parent node. The oriented tree adopts at least two different one-way functions for iteration.

The calculation module is configured to perform iterations on the basekey by visiting the oriented tree in a topological order to obtain the derived key of the current version.

The embodiment II is a method embodiment corresponding to the present embodiment. The technical details in the embodiment I can be applied to the present embodiment, and the technical details in the present embodiment can also be applied to the embodiment I.

It should be noted that those skilled in the art should understand that the implementation functions of each module shown in the embodiment of the system for deriving a key from basekey built-in the chip can be understood by referring to the related description of the method for deriving a key from basekey built-in the chip. The functions of each module shown in the embodiment of the system for deriving a key from basekey built-in the chip can be realized by a program (executable instruction) running on a processor or by a specific logic circuit. If the system for deriving a key from basekey built-in the chip in the embodiment of this specification is realized in the form of a software function module and sold or used as an independent product, it can also be stored in a computer readable storage medium. Based on this understanding, the technical solutions of the embodiments of the present disclosure can be embodied in the form of software products in essence or part of contributions to the prior art. The computer software product is stored in a storage medium, and includes several instructions to enable a computer device (which may be a personal computer, server, or network device, etc.) to perform all or part of the methods described in the embodiments of the present disclosure. The foregoing storage media include various media that can store program code, such as a U disk, a mobile hard disk, a read-only memory (ROM, Read Only Memory), a magnetic disk, or an optical disk. In this way, the embodiments of the present disclosure are not limited to any specific combination of hardware and software.

Correspondingly, the embodiments of the present disclosure also provide a computer storage medium in which computer-executable instructions are stored. When the computer-executable instructions are executed by a processor, the method embodiments of the present application are implemented. Computer-readable storage media comprise permanent and non-permanent, removable and non-removable media can be any method or technology to achieve information storage. Information can be computer-readable instructions, data structures, modules of programs, or other data. Examples of a storage medium of a computer include, but are not limited to, Phase Change Memory (PRAM), Static Random Access Memory (SRAM), Dynamic Random Access Memory (DRAM), Other Types of Random Access Memory (RAM), Read Only Memory (ROM), Electrically Erasable Programmable Read Only Memory (EEPROM), Flash Memory or other Memory Technology, Read Only Disc Read Only Memory (CD-ROM), Digital Versatile Disc (DVD) or other optical storage, Magnetic Tape Cassette, Magnetic tape magnetic disk storage or other magnetic storage device or any other non-transmission medium that can be used to store information that can be accessed by a computing device. As defined herein, computer-readable storage media do not include temporary computer-readable media, such as modulated data signals and carrier waves.

It should be noted that in the application documents of the present patent, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In the application file of this patent, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

All documents referred to in this specification are deemed to be incorporated in their entirety in the disclosure of this specification so as to serve as a basis for modifications where necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition the processes described in the drawings do not necessarily require a particular order or successive order shown to achieve the desired results. In some embodiments, multitasking and parallel processing are also possible or may be advantageous.

What is claimed is:

1. A method for deriving a key from a basekey built-in a chip, comprising:
    performing, by a hardware processor, steps of:
        obtaining a basekey built-in the chip and a current version number when the chip starts up and runs read-only boot code;
        constructing a oriented tree, each node in the oriented tree corresponds to a version, a topological order number of each node indicates a version number corresponding to the node, the basekey is located at a root node of the oriented tree, a version number of any node is smaller than a version number of its parent node,
        wherein the oriented tree adopts at least two different one-way functions; and
        performing iterations on the basekey by visiting the oriented tree in a topological order to obtain a derived key of a current version,
        wherein the step of performing iterations on the basekey by visiting the oriented tree in the topological order to obtain the derived key of the current version further comprises:
            hiding nodes with version numbers larger than the current version number in the oriented tree; and
            performing iterations on the basekey to generate derived keys of version numbers corresponding to all nodes whose parent nodes are hidden.

2. The method of claim 1, wherein a one-way function is a secure hash function, and the at least two different one-way functions are derived by adding auxiliary parameters to the secure hash function.

3. The method of claim 1, further comprising:
    performing, by the hardware processor, iterations on the derived key of the current version according to the topological order of the oriented tree to generate a historical derived key when the historical derived key of a previous version prior to the current version number which has not been iteratively generated is required to be used.

4. The method of claim 1,
wherein the oriented tree is a two-dimensional matrix graph,
wherein a first node in each row in the two-dimensional matrix graph comprises a longitudinal sub-node and a transverse sub-node, a last node in each row does not comprise any sub-node, and remaining nodes of the oriented tree each only comprises a transverse sub-node,
wherein nodes in a first column in the two-dimensional matrix graph perform iterations via a first one-way function, and nodes in each row in the two-dimensional matrix graph perform iterations via a second one-way function, and
wherein the topological order number of each node in each row decreases one by one, and the topological order number of the last node in each row is greater than that of all nodes on its next row.

5. The method of claim 4, wherein the step of performing iterations on the basekey according to the oriented tree and the topological order to obtain the derived key of the current version further comprises:
performing, by the hardware processor, iterations on the basekey to generate the derived key of the current version and the derived key of a version corresponding to a first node in a row next to a row in which a node with the current version is located.

6. The method of claim 5, further comprising:
performing, by the hardware processor, iterations on the derived key of the current version or the derived key of the version corresponding to the first node in the row next to the row in which the node with the current version is located according to topological order numbers of the oriented tree to generate a history derived key when the historical derived key of a previous version prior to the current version number is required to be used.

7. A system for deriving a key from a basekey built-in a chip, comprising:
an acquisition module, configured to obtain a basekey built-in a chip and a current version number when the chip starts up and runs read-only boot code;
a construction module, configured to construct an oriented tree, each node in the oriented tree corresponds to a version, a topological order number of each node indicates a version number corresponding to the node, the basekey is located at a root node of the oriented tree, a version number of any node is smaller than a version number of its parent node,
wherein the oriented tree adopts at least two different one-way functions;
a calculation module, configured to:
perform iterations on the basekey by visiting the oriented tree in a topological order to obtain a derived key of a current version;
hide nodes with version numbers larger than the current version number in the oriented tree; and
perform iterations on the basekey to generate derived keys of version numbers corresponding to all nodes whose parent nodes are hidden; and
a hardware processor that executes the acquisition module, the construction module, and the calculation module.

8. The system of claim 7, wherein a one-way function is a secure hash function, and the at least two different one-way functions are derived by adding auxiliary parameters to the secure hash function.

9. The system of claim 7, the calculation module is further configured to:
perform iterations on the derived key of the current version according to the topological order of the oriented tree to generate a historical derived key when the historical derived key of a previous version prior to the current version number which has not been iteratively generated is required to be used.

10. The system of claim 7,
wherein the oriented tree is a two-dimensional matrix graph,
wherein a first node in each row in the two-dimensional matrix graph comprises a longitudinal sub-node and a transverse sub-node, a last node in each row does not comprise any sub-node, and remaining nodes of the oriented tree each only comprises a transverse sub-node,
wherein nodes in a first column in the two-dimensional matrix graph perform iterations via a first one-way function, and nodes in each row in the two-dimensional matrix graph perform iterations via a second one-way function, and
wherein the topological order number of each node in each row decreases one by one, and the topological order number of the last node in each row is greater than that of all nodes on its next row.

11. The system of claim 10, wherein the calculation module is further configured to:
perform iterations on the basekey according to the oriented tree and the topological order to obtain the derived key of the current version; and
perform iterations on the basekey to generate the derived key of the current version and the derived key of a corresponding version of a first node in a row next to the row in which a node with the current version is located.

12. The system of claim 11, the calculation module is further configured to:
perform iterations on the derived key of the current version or the derived key of the corresponding version of the first node in the row next to the row in which the node with the current version is located according to the topological order number of the oriented tree to generate a history derived key when the historical derived key of a previous version prior to the current version number is required to be used.

13. A method for deriving a key from a basekey built-in a chip, comprising:
performing, by a hardware processor, steps of:
obtaining a basekey built-in the chip and a current version number when the chip starts up and runs read-only boot code;
constructing a oriented tree, each node in the oriented tree corresponds to a version, a topological order number of each node indicates a version number corresponding to the node, the basekey is located at a root node of the oriented tree, a version number of any node is smaller than a version number of its parent node,
wherein the oriented tree adopts at least two different one-way functions,
wherein the oriented tree is a two-dimensional matrix graph,
wherein a first node in each row in the two-dimensional matrix graph comprises a longitudinal sub-node and a transverse sub-node, a last node in each row does not comprise any sub-node, and remaining nodes of the oriented tree each only comprises a transverse sub-node, wherein nodes in a first column in the two-dimensional matrix graph perform iterations via a first one-way function, and nodes in each row in the two-dimensional matrix graph perform iterations via a second one-way function, and wherein each topological order number of each node in each row decreases one by one, and the topological order number of the last node in each row is greater tha n that of all nodes on its next row; and performing iterations on the basekey by visiting the oriented tree in a topological order to obtain a derived key of a current version.

14. The method of claim 13, wherein a one-way function is a secure hash function, and the at least two different one-way functions are derived by adding auxiliary parameters to the secure hash function.

15. The method of claim 13, wherein the step of performing iterations on the basekey according to the oriented tree and the topological order to obtain the derived key of the current version further comprises:

performing, by the hardware processor, iterations on the basekey to generate the derived key of the current version and the derived key of a version corresponding to a first node in a row next to a row in which a node with the current version is located.

16. The method of claim 15, further comprising:

performing, by the hardware processor, iterations on the derived key of the current version or the derived key of the version corresponding to the first node in the row next to the row in which the node with the current version is located according to topological order numbers of the oriented tree to generate a history derived key when the historical derived key of a previous version prior to the current version number is required to be used.

* * * * *